Jan. 2, 1923. 1,440,373
J. CAMILLER ET AL.
MULTICOLOR SCREEN FOR NATURAL COLOR CINEMATOGRAPHY AND PHOTOGRAPHY AND IN THE
MANUFACTURE THEREOF
FILED Nov. 1, 1920.
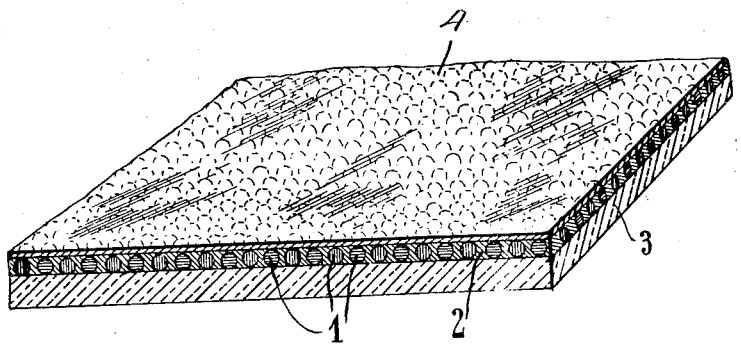
INVENTORS
J. Camiller
BY A. Hay
H. R. Kerslake
ATTY.

Patented Jan. 2, 1923.

1,440,373

UNITED STATES PATENT OFFICE.

JOHN CAMILLER AND ADAM HAY, OF LONDON, ENGLAND.

MULTICOLOR SCREEN FOR NATURAL COLOR CINEMATOGRAPHY AND PHOTOGRAPHY AND IN THE MANUFACTURE THEREOF.

Application filed November 1, 1920. Serial No. 421,129.

*To all whom it may concern:*

Be it known that we, JOHN CAMILLER, a subject of the King of Great Britain and Ireland, and residing at Wykeham Mansions, 20 Rosendale Road, West Dulwich, London, S. E. 21, England, and ADAM HAY, a subject of the King of Great Britain and Ireland, and residing at 49 Old Bond Street, London, W. 1, England, have invented certain new and useful Improvements in Multicolor Screens for Natural Color Cinematography and Photography and in the Manufacture Thereof, of which the following is a specification.

This invention relates to multicolor screens for natural color cinematography and still photography, of the kind in which colored particles are used wholly or in part in conjunction with a tacky substance to form the color screen, the object of the invention being to provide an improved screen of this character by means of a process which is very much simplified as compared with known processes.

According to our invention we mix the colored grains into a paste with a liquid tacky material, of a composition which will not impair the color of the grains and with this paste we coat a suitable plate of glass or other convenient material. The grains or particles may comprise threads or particles of glass or other suitable transparent or translucent material capable of being colored but of such a nature as to repel or to resist any dye that may be applied to the liquid tacky material for the purpose of coloring the same, and the grains or particles may be of one or more primary or other colors according to the character of the screen that is desired and the purpose for which it is to be employed. Referring now to the accompanying drawing which is a perspective view in section showing one form of screen in accordance with the invention.

The grains or particles 1 will be all of one color and will be mixed into a paste with a tacky substance 2 such as gelatine, fish glue, or other like material which will not dissolve the grains, and which is dyed with another color with a suitable dye solution preferably warmed to, say 60° F., in order to soften the gelatine. The paste is then applied to the film or base 3 and the outer surface 4 of the screen cleaned and dried in order to remove any dye that may be adhering to the surface of the particles, the result being a two-color screen ready for any desired operation.

In a similar manner a screen or film of three colors, five colors or other desired number of colors may be produced by employing grains or particles of the requisite plurality of colors.

If desired we may protect the prepared surface of the screen with a suitable transparent varnish or other medium.

The grains may, if desired, be formed by dissolving a gum or like substance such as "gum sandrac" in alcohol or other solvent, the solvents being dyed any desired color and then driving off the solvent so as to leave the colored gum which is then crushed to form particles.

For dyeing the grains we use dyes which will be dissolved in the same solvent as that for the gum employed.

In order to facilitate the mixing and spreading of the pasty mixture formed from the "tacky" substance and colored grains, we prefer to add glycerine to the mixture when preparing the same.

Having now particularly described and ascertained the nature of our said invention and in what manner the same is to be performed, we declare that what we claim is:—

1. A process for the production of a multicolor screen of the kind referred to, which consists in mixing solid colored grains with a tacky medium of a composition which will not impair or absorb the color of the grains and then coating a convenient support with the mixture.

2. A process according to claim 1 in which an additional color is obtained by suitably staining the tacky medium holding the colored grains.

3. A process according to claim 1, according to which glycerine is added to the pasty mixture formed from the tacky substance and colored grains.

In testimony whereof we have signed our names to this specification.

JOHN CAMILLER.
ADAM HAY.